Patented Feb. 19, 1935

1,992,154

UNITED STATES PATENT OFFICE 1,992,154

PREPARATION OF ALPHA-NAPHTHOL

Edgar C. Britton and Wesley C. Stoesser, Midland, Mich., assignors to The Dow Chemical Company, Midland, Mich., a corporation of Michigan No Drawing. Application November 10, 1932, Serial No. 642,021

2 Claims. (Cl. 260—154)

The invention relates to methods for the preparation of alpha-naphthol.

The preparation of alpha-naphthol is ordinarily effected by sulphonating naphthalene, treating the mixture of isomeric naphthalene monosulphonic acids to form the sodium salts thereof, fusing the so-formed salts with sodium hydroxide, acidifying the products of the fusion with sulphuric acid or carbon dioxide, and separating the alpha-naphthol from the reaction mixture by distillation with superheated steam. However, since both alpha- and beta-naphthols are formed in carrying out the foregoing process, and since their boiling points are relatively close together, i. e. 280° C. for the alpha- and 286° C. for the beta-compound, there is occasioned considerable difficulty in the separation of the alpha-compound in pure form.

The preparation of alpha-naphthol by the hydrolysis of alpha-chloronaphthalene is disclosed in United States Patent 1,062,351. The conditions under which the hydrolysis is accomplished are set out as the treatment of alpha-chloronaphthalene with a 10 per cent aqueous caustic soda solution for 6 hours under pressure at a temperature of 280°–300° C. A yield of 50–60 per cent of alpha-naphthol is thereby obtained. In a pending application of Edgar C. Britton et al., Serial No. 454,303, filed May 21, 1930, it is disclosed that the chlorination of naphthalene always yields a mixture of isomeric alpha- and beta-chloronaphthalenes, the latter usually being present in amount varying from 5 to 10 per cent. It is, therefore, apparent that the hydrolysis of the product formed by the chlorination of naphthalene would not yield a pure alpha-naphthol but rather a mixture of alpha- and beta-naphthol, and that the problem of separating the alpha- from the beta- form still exists. Furthermore, the possibility of chlorinating naphthalene and separating the alpha-chlorocompound from the isomeric beta-compound before hydrolysis thereof is substantial eliminated because there is less than two degrees C. difference in their boiling points.

In contrast to the foregoing, we have now found that naphthalene can be brominated to yield pure alpha-bromonaphthalene and that such alpha-bromonaphthalene can be hydrolyzed directly in the presence of a copper-containing catalyst to give an exceptionally high yield of pure alpha-naphthol. Moreover, we have found that the use of said catalyst permits the hydrolysis of the alpha-bromonaphthalene to be carried out at a materially lower temperature than would otherwise be required thereby avoiding the formation of isomeric naphthols, and furthermore, that iron apparatus can be employed for carrying out the hydrolysis.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

The bromination of the naphthalene may be carried out at room temperature as by permitting bromine to drip on naphthalene, or by brominating the naphthalene in a suitable solvent, e. g. ethylene chloride. The product of the foregoing bromination can then be hydrolyzed directly to pure alpha-naphthol, without any isomeric beta-naphthol being formed, at temperatures materially lower than heretofore disclosed for the hydrolysis of mono-chloronaphthalene. The following examples serve to illustrate the results obtained by carrying out our novel method for the preparation of alpha-naphthol.

Example 1

A copper bomb was charged with 51.8 grams of alpha-bromonaphthalene obtained by brominating naphthalene without a solvent, and 250 grams of a 10 per cent aqueous sodium hydroxide solution. The contents of the bomb were heated at a temperature of about 225°–230° C. for a period of one hour. The bomb was then cooled and the contents removed. The filtrate was acidified with dilute sulphuric acid, cooled to room temperature and filtered. The crystals were dried, and distilled under an absolute pressure of 21 millimeters of mercury at a temperature of 152°–158° C. to recover the alpha-naphthol. The yield of pure alpha-naphthol, having a melting point of 93.7° C. was 32.5 grams or 90.3 per cent of theoretical.

Example 2

In carrying out this run the same charge of alpha-bromonaphthalene was used but the concentration of the sodium hydroxide solution was increased to 15 per cent. The reaction conditions, that is the apparatus, temperature, time, etc., were the same as in the preceding run. The yield of alpha-naphthol obtained was 92.4 per cent of theoretical, and the melting point of the compound was 93.4° C.

*Example 3*

An iron bomb was charged with 69.0 grams of alpha-bromonaphthalene, 222.3 grams of a 15 per cent aqueous sodium hydroxide solution and 10.0 grams of cuprous oxide. The contents of the bomb were maintained at a temperature between 225° and 229° C. for a period of 6½ hours. The bomb was then cooled, the contents removed and worked up substantially as described in Example 1. There was obtained 43.1 grams of pure alpha-naphthol melting at 93.6° C., or an 89.8 per cent of theoretical yield.

The preferred temperature range for carrying out the hereinbefore described hydrolysis is between about 180° and about 250° C., although higher temperatures may be used if desired, but, in general, they tend to produce some beta-naphthol. In carrying out the hydrolysis in a copper bomb we have determined that temperatures as low as 180° C. may be used but that a longer time is required for the reaction to go to completion. Among the hydrolytic agents which we may substitute for the sodium hydroxide in the reaction are potassium hydroxide, calcium hydroxide, sodium carbonate, etc. The catalyst may be either metallic copper, or a copper compound, e. g. copper oxide, copper chloride, etc. While we have described the use of dilute sulphuric acid for acidifying the product of the reaction between the alpha-bromonaphthalene and hydrolytic base we may use any acid such as hydrobromic acid, hydrochloric acid, or other comparable acids.

Among the advantages of our improved method for the preparation of alpha-naphthol are—(1) Exceptionally high yields of the desired product are obtained; (2) no isomeric beta-naphthol is formed during the course of the reaction; (3) the low temperature at which the hydrolysis can be carried out permits the use of steam as the heating agent which is desirable as well as economical; and, (4) iron apparatus can be used for carrying out the hydrolysis and the copper catalyst does not have to be insulated therefrom.

Other modes of applying the principle of our invention may be employed instead of those explained, change being made as regards the details herein disclosed, provided the details stated by any of the following claims or the equivalent thereof be employed.

We therefore particularly point out and distinctly claim as our invention:—

1. In a method of preparing alpha-naphthol, the steps which consist in brominating naphthalene, reacting the product with an aqueous hydrolytic base under pressure at a temperature between about 180° C. and about 250° C. in the presence of a copper-containing catalyst, and separating alpha-naphthol from the reaction product.

2. In a method of preparing alpha-naphthol, the steps which consist in brominating naphthalene, reacting under pressure the product with an aqueous hydrolytic base at a temperature above about 180° C. in the presence of a copper-containing catalyst, and of separating alpha-naphthol from the reaction product.

EDGAR C. BRITTON.
WESLEY C. STOESSER.